Oct. 4, 1932.  E. J. W. RAGSDALE  1,880,481
AIRCRAFT CONSTRUCTION AND METHOD OF MAKING SAME
Filed Sept. 13, 1929  4 Sheets-Sheet 1

INVENTOR.
EARL J. W. RAGSDALE
BY John P. Tarbox
ATTORNEY.

Oct. 4, 1932.  E. J. W. RAGSDALE  1,880,481
AIRCRAFT CONSTRUCTION AND METHOD OF MAKING SAME
Filed Sept. 13, 1929  4 Sheets-Sheet 3

INVENTOR.
EARL J.W. RAGSDALE
BY
John P. Tarbox
ATTORNEY.

Oct. 4, 1932.  E. J. W. RAGSDALE  1,880,481
AIRCRAFT CONSTRUCTION AND METHOD OF MAKING SAME
Filed Sept. 13, 1929  4 Sheets-Sheet 4

INVENTOR.
EARL J.W.RAGSDALE
BY John P. Tarbox
ATTORNEY.

Patented Oct. 4, 1932

1,880,481

UNITED STATES PATENT OFFICE

EARL J. W. RAGSDALE, OF NORRISTOWN, PENNSYLVANIA, ASSIGNOR TO EDWARD G. BUDD MANUFACTURING CO., OF PHILADELPHIA, PENNSYLVANIA, A CORPORATION OF PENNSYLVANIA

AIRCRAFT CONSTRUCTION AND METHOD OF MAKING SAME

Application filed September 13, 1929. Serial No. 392,319.

The aircraft body of my invention is a fuselage for an airplane. Aircraft bodies at large, however, including those in dirigibles, have many requirements in common. The requirements met in reason by this fuselage are found in other aircraft bodies of any description. My invention may be equally applicable to them and perhaps from some standpoints applicable to an even greater extent than in the construction of airplane fuselages.

Particularly is the foregoing true in view of the fact that the outstanding object of my invention has been the production of an aircraft body of light gauge sheet metal electrically welded together. Particularly is it true in view of the fact that it has been specifically my object to use light gauge rustless alloy steel of high physical characteristics giving it a very small weight for its strength, and to electrically spot weld these parts together. Spot welding is probably the fastest known process of joining parts together by individual separated fastenings. It is probably also the cheapest known way of making the joints of structures having sections of widely varying form at the joints. In common with other forms of electric welding, it provides fastening means of zero weight in that no weight whatever is added to the sheet metal parts which are joined together. Yet accompanying this already great array of advantages, electric welding has a strength of the metal of the parts themselves and properly used produces a joint at least equal to and in most cases greatly exceeding the strength of the parts which it joins. The strength of the joints is limited only by the number and extent of the welds, since the welding itself, unlike riveting which requires cutting away of the bodies of the parts, does not reduce the section of the parts in any manner whatsoever. These two criterions, reduction of weight through alloy steel and an elimination of weight from fastening devices, plus the great increase of strength in electric welding will help the aeronautical engineer most materially.

Generally stated, the method of my invention is first joining together those longitudinally extending parts of the cross sections of the members which may in longitudinal section be arranged to present outwardly of the body, to form a complete built-up skeleton form of such body, and thereafter joining to these outwardly presenting cross sections the complemental inwardly presenting cross sections which complete the parts. Joinder of the outwardly presenting cross sections to each other is from the inside of those cross sections as accessible from the outside of the body for the most part. Joinder of the inwardly presenting complemental cross sections is from the exterior of both cross sections as accessible likewise from the exterior of the body at large.

Aircraft body constructions are usually in the form of a plurality of combined trusses. One of the strongest forms is comprised of tubular chords and tubular transverse and diagonal struts. These constitute truss members of closed transverse cross section. In the structure built according to the method of my invention I also utilize chord and strut members of closed cross section but instead of longitudinal one piece such members as tubes, I utilize longitudinal two piece such members, the one piece members complemental to each other in such plane in each case as to divide the member longitudinally into its transverse outwardly presenting cross section and its transverse inwardly presenting cross section as respects the exterior and interior of the body. With such members the general method of my invention may be freely practiced.

More specifically stated, I utilize truss members of box cross section in general of rectangular form. In the case of chords, I form these members longitudinally in two parts in the diagonal plane of the section. The inner part is the longitudinal outwardly presenting cross sections of the chords and the outer part is the longitudinal inwardly presenting cross sections of the chord. I outwardly flange the edges of the inner part and inwardly extend the edges of the outer part to complementally overlap them whereby they may be joined together through the overlapped flanges of these edges. In the case of the struts I fabricate them in longitudinal divisions substantially in the plane of the outer face of the box cross section, thus to form a channel cross section outwardly presenting member and a substantially plane form inwardly presenting member. Outturned edge flanges are provided on the edges of the channel section member and sufficient width given the complemental member of plane form to permit its edges to overlap and be secured to the outturned edges of the inner channel section member. According to the general method of my invention I join together all of the outwardly presenting parts of the truss members by way of the interiors of their cross sections as accessible from the exterior of the body by reason of the outward presentation of their cross sections. This comprises the joining of the side and bottom walls of the channel cross section strut members or extensions of such walls to the side walls of the angle cross section of the chords or the extensions of the same. Gusset reinforcements for cross braces as needful interiorly of the body are then applied and secured also from the interior of the outwardly presenting cross sections of the chord members and struts. Then gussets or other reinforcing devices needful in the interior of the joint structures so fabricated, likewise by securement from inside, are applied to the interiors of the outwardly presenting cross sections. Finally, I close the outwardly presenting cross sections which have afforded this general accessibility for the securement of all parts together from points interiorly of themselves by applying to them in succession the complemental parts of inwardly presenting cross section and securing them together through their overlapping edges flanged and otherwise both in the instance of the chords and the instance of the struts. Thus are the method and structure of my invention intimately intertwined.

In the accompanying drawings I show the best embodiment of my invention now known to me.

Figures 15, 16 and 17 are respectively side and end elevations and plan of the end or tail of the aircraft body showing the endmost joints, while

Figure 1:
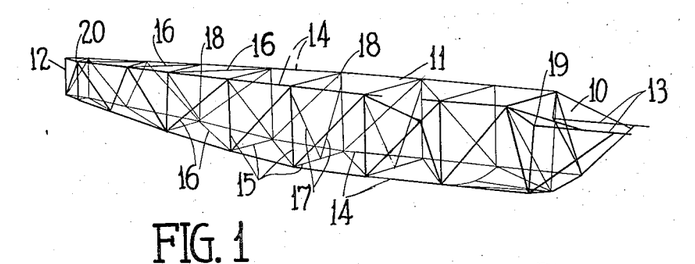
Figure 1 is a perspective diagram of a typical airplane fuselage or aircraft nacelle of tubular cross section.

Referring to the perspective diagram of Fig. 1, it will be seen that the body illustrated is of substantially rectangular cross section and of the usual approximate stream line form in which there is a gradual enlargement of cross section from the nose portion 10 to an intermediate region 11 and thereafter a gradual diminishing cross section to the end or tail 12 of the structure. In the nose of the body diagram is diagrammed a portion of the truss structure supporting engine bearers 13. This portion is irregular as respects the main body which is characterized by conventional regularity of truss form. In its conventional form it is comprised of longitudinally extending chord members 14 cross connected to each other in the outer surfaces of the body by transverse and diagonal struts 15 and 16 respectively. The functions of these parts are so well understood as to need no description. Commonly they are made of steel tubing, arc welded or acetylene welded together at the joints 18 to the chord members 14 and similarly at other joints such as 19 in the motor supporting front end and 20 at the tail end.

In connection with the body of such construction so fabricated, there arise many difficulties which are obviated altogether by my invention as will be seen. Prominent among them are a warping of the structure from desired dimensions under the high and non-uniformly applied welding operations, and a dangerous crystallizing of the metal incident to improper and non-uniform welding treatment and cooling and annealing difficulties.

Figures 2, 3, 4, 5, 6, 7:
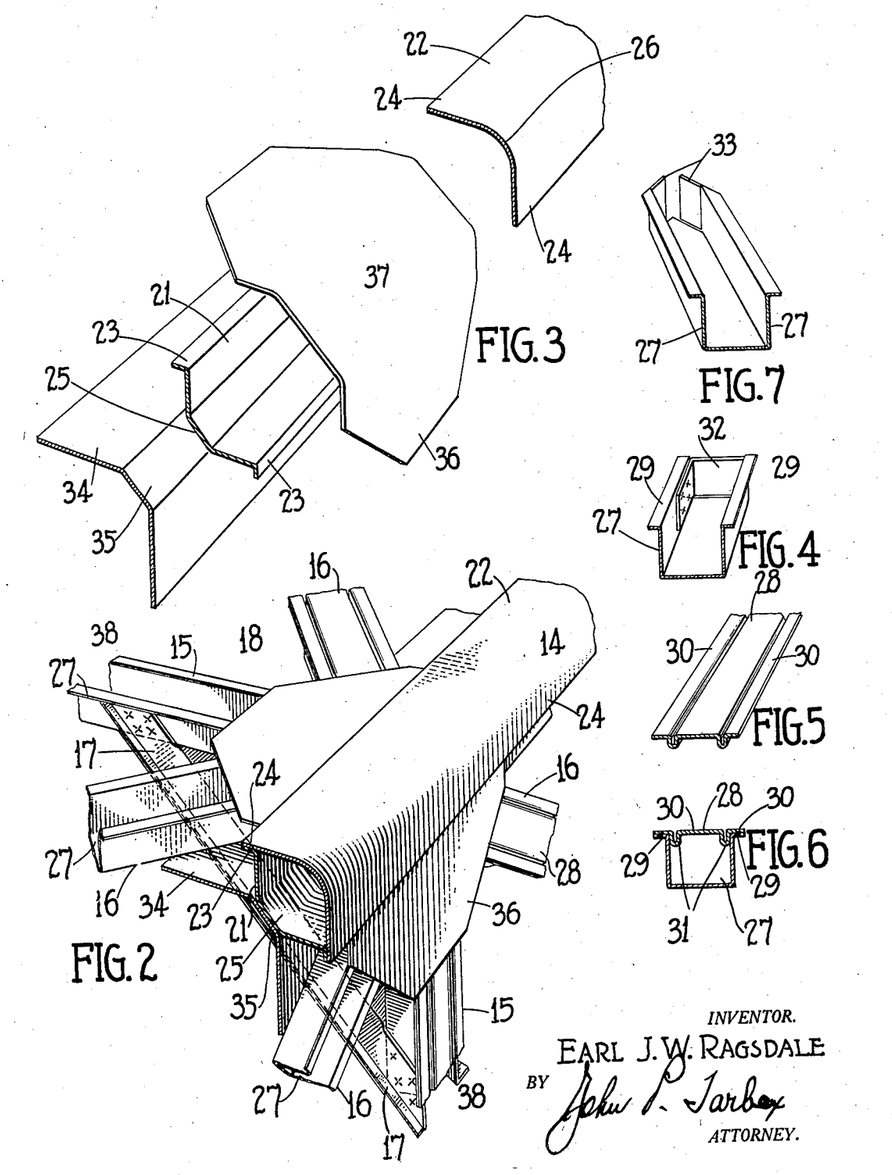
Figure 2 is a perspective view of one of the numerous intermediate joints of such a body as completely fabricated according to my invention.
Fig. 3 is a perspective of the complemental longitudinally extending parts of the chord and inner and outer joint reinforcing gussets in the juxtaposed position of assembly but spaced apart for a clear showing of the sections.
Figures 4 and 5 are respectively perspectives of the outwardly and inwardly presenting cross sections of the parts of a transverse strut.
Figure 6 is a transverse sectional view of a complete strut.
Figure 7 is a perspective of the outwardly presenting part of the diagonal strut.

Fig. 2 shows a joint 18 as fabricated by my structure and according to my method. The complete members of the body are given the numbers of corresponding parts in the diagram of Fig. 1. But instead of being composed of tubes or members of one piece cross section, these members are composed each of the longitudinally extending multi-part cross sections shown in Figs. 3 to 6.

The chords, (or longerons, as they are commonly called,) are comprised of the inner outwardly presenting angle cross section part 21 and the complemental outer inwardly presenting angle cross-section part 22. The edges of the angle cross section of the part 21 are provided with outwardly extended flanges 23. The edges 24 of the outer part 22 are extended complementally to overlap the flanges 23. Thus is formed a box section chord member 14 of two opposed cross sections longitudinally divided from each other (or when completed, secured to each other) substantially in the diagonal plane of its transverse cross sections. The apex 25 of the angle cross sectioned inner part 21 is flattened diagonally of the interior of the body to facilitate placement of reinforcements. The apex 26 of the outer part 24 is rounded to permit round drawing of fabric or other covering thereover.

The construction of the transverse and diagonal strut members 15—16 appears in detail in Figs. 4 to 7 inclusive. The channel cross section outwardly presenting part is designated 27. The substantially plane section inwardly presenting part which closes the mouth of the channel to form the substantially rectangular box section of Fig. 6 is designated 28. 29 are the outturned flanges of the side walls of the channels. 30 are the complementally extended edges of the inwardly presenting parts 28. These inwardly presenting parts 28 are provided adjoining edges 30 and contiguous with the side walls or channels 27 with beads 31 for the purpose of initially positioning the edges 30 for complemental securement to the flanges 29, and subsequent addition to the strength and stiffness of the box cross section. The transverse struts are provided in their ends with U clips 32 having their sides spot welded to the side walls of the channels 27 as shown in Fig. 4, to position the bight of the U across the end of the member in transverse extension of the side walls of the channel cross section. But, as it will be seen, this U shaped clip may be and preferably is pre-attached by its bight to chord member 14 and thereafter attached by its sides to the side wall of the channel. In the case of the diagonal cross members there are provided, as shown in Fig. 7, integral extensions 33 from the side walls of the channel at an angle to those side walls complemental to the angle of the diagonal itself. Similar such integral extensions may be employed in lieu of the U shaped clips 32 as will appear.

Figure 9:
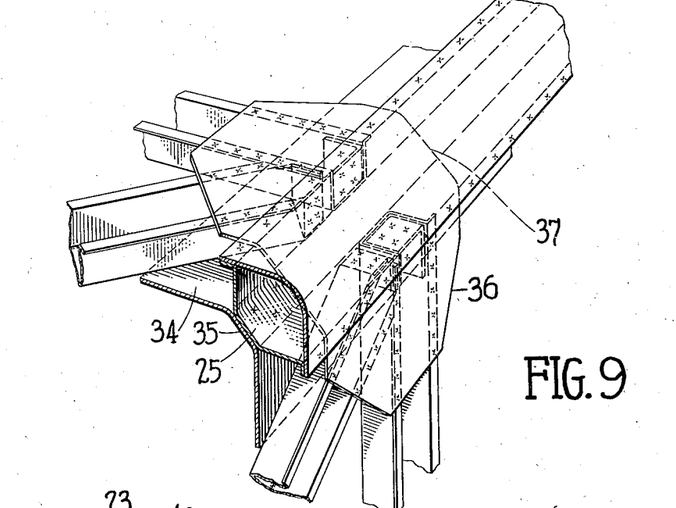
Figure 9 is a perspective view at a joint of the outwardly presenting part of a chord and transverse and diagonal struts in adjoining sides of a body, as reinforced by gusset members and cross braces interiorly of the body and a gusset member interiorly of the joint itself according to intermediate steps of my invention.

The reinforcing gussets interior to the body are shown in Figs. 2, 3 and 9 and are designated 34. They are angular in transverse cross section and provided with a flattened apex 35 complemental to the flattened apex 25 of the part 21 of the chord members 14. In lateral and longitudinal extent they cover a substantial area co-extensive with the general area of the joint 18 and sufficient to overlap to a considerable extent each of the chord and strut members of the joint.

In Figs. 2, 3 and 9 also appear the reinforcing gussets 36 interior with respect to the joints 18. These too are of angular form and have flattened apex portions 37, in this case of a lateral expanse reaching in plane form diagonally across the closed cross section of the chord members 14 from joint to joint of its parts. Its expanse is co-extensive in general with that of the joint including the gusset 34 and overlapping to a considerable degree the various strut members.

Diagonal cross braces 17 are of a transverse cross section and longitudinal cross section essentially similar to the transverse and diagonal struts 15 and 16 depicted in Figs. 4 to 7. But the side walls of the channel cross sections and perhaps other walls of the cross section at large are longitudinally extended to overlap the walls of the transverse struts 15 (or the diagonal struts 16 with which they are to be connected as indicated at 38).

Figure 8:
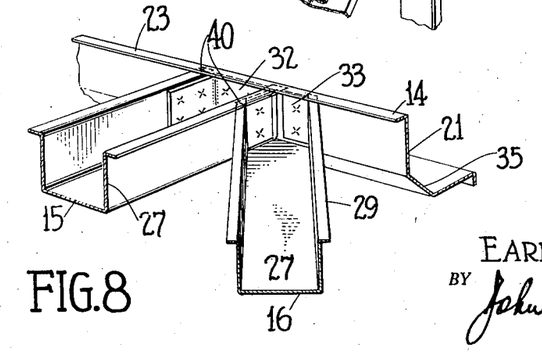
Figure 8 is a perspective of the outwardly presenting parts at a joint of a chord and transverse and diagonal struts, as assembled together according to the earlier steps of my invention.
Figure 10:
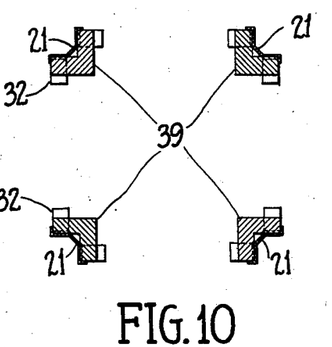
Figures 10 to 14 inclusive are transverse cross sections of the aircraft body in various stages of fabrication acording to my method, the stages succeeding each other in numerical order from beginning to completion.

In assembly the first step is that shown in Fig. 10. The longitudinally extending outwardly presenting angle section parts 21 of the chord members 14 are first laid upon the spaced supports 39 of the jig of proper dimensions to place these parts in the transverse relations at all points which they should occupy in the completed body. The supports 39, it should be understood, are spaced apart longitudinally to avoid the locations of the joints 18 so that they do not interfere with the placement of the strut members. Next, the outwardly presenting channel cross section parts 27 of either the diagonal or transverse strut members, or both of them, previously fabricated to correct inter-cord lengths, are placed successively in the positions relative to the joints which they are to occupy when the body is completed. They have been pre-fabricated to proper lengths. Their ends are joined to the part 21 against which they abut in the succession in which they are placed in position. Joinder is by spot welding or otherwise, applied from the interior of the outwardly presenting section of the chord and strut parts respectively. The spot welds join together the extended walls 32—33, etc. of the strut parts and side wall of the angle cross section chord part 21, as clearly shown in Fig. 8. As explained heretofore, preferably the clips 32 are spot welded to the chord part 21 prior to the joining of the struts 27 thereto. This is illustrated in Fig. 10. In such case the transverse struts may or may not have extensions of their side walls, the side walls being joined to the clips 32 within the channel shaped cross section. Preferably the transverse (sometimes termed the vertical) strut parts are first joined and thereafter the diagonal struts. In every case one extension 33 of the diagonal strut 16 is spot welded to a side wall of part 21 of the chord 14 while the other is spot welded to a side wall of a transverse strut 15 as appears in Fig. 8. The depth of the channel cross section of the parts 27 is preferably substantially equal to the height of the wall of the chord part 21 to which they are joined so that they do not overlap the apex 25 of the part 21. As a consequence also the edge flanges 29 of these channel section parts of the struts, when cut to proper length, may be overlapped upon each other as indicated at 40 in Fig. 8 and duly spot welded together, and to the edge flanges 23 of the part 21, which flanges they also overlap. Such edge flange overlapping may or may not be employed as desired.

Figure 12:
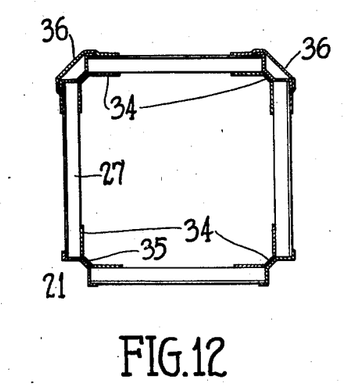

Except for the completion of the nose portion carrying the engine beds 13 and the tail portion 12 which may or may not be completed while the body is on the jig supports 39, the skeleton formed by so joining together the outwardly presenting longitudinally extending cross sections of the chords and struts in this first stage is precisely of the form of the completed body, and is furthermore sufficiently rigid by reason of the generous spot welding of the parts together including particularly the diagonal braces as to permit the skeleton to be removed from the jig and subsequent operations to be carried on independently of the jig. Such removal is illustrated in Fig. 12. In Fig. 12 the next steps of the method of assembly are illustrated as having been taken. The next in order is the application of the gussets 34 interiorly of the body as respects the chords and struts. The flattened apexes 35 of the gusset members are spot welded to the flattened apexes 25 of the chord members by reaching interiorly of the outwardly present chord part 21. They are likewise spot welded to the bottom wall of the channel section outwardly presenting strut parts 27 by reaching interiorly of these channel cross sections. It will be observed that these operations, just as the foregoing operations of joining the strut and chord parts, are preformed from the exterior of the body skeleton with a higher freedom access to each and all section interiors.

Following this the reinforcing gussets 36 which are to lie interiorly of the joint are applied. The central portion 37 of this diagonal spans the open mouth of part 21 at the joint. Its opposite arms lie flat upon the flanges 23 and 29 of the chord and strut parts 21 and 27 and are spot welded to these flanges as effectually illustrated in Fig. 9.

These gusset members so applied on opposite sides of the strut members, the inner 34 to the bottom wall of the struts and to the apex 25 of the part 21 and the outer 36 to the edge flanges of the members, form with the side walls of the part 21 sockets receiving the ends of the struts and retaining them in position. But contrary to the usual practice in which the socket is first formed and the member thereafter placed within it, in this instance the members are placed and thereafter the socket is formed outside of them and secured to them. Clearly this process admits of an extent of socket and an extent of securement of the parts to be joined in the socket, freely and in all cases adequately adjustable to the physical requirements of the joint.

Figure 11:
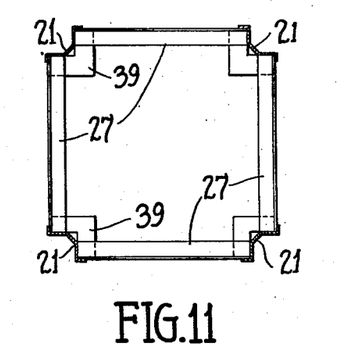
Figure 13:
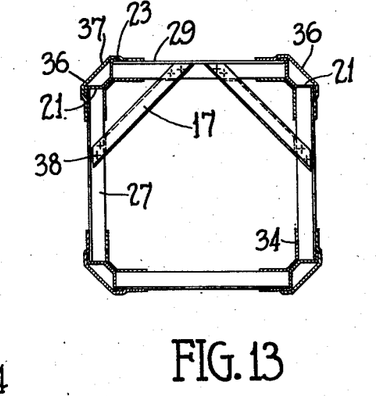

In Fig. 13 the cross braces 17 are applied as the next step. Their wall extensions overlap exteriorly of the side walls of strut parts 27 and are, as in prior cases, spot welded in place from the interior of the still open outwardly presenting strut cross section. These members may, if desired, be put in place before the joint gussets 36, since there is no interference of access between them. In cases of interference between them and the interior body gussets 34, brace connection may precede this attachment. Should the skeleton as it passes the initial stages of Fig. 11, by reason of great size, be not entirely as rigid as desired for ensuing fabrication, these cross braces 17 may and should be applied before the gussets 34 and 35, since the application of these gussets renders the joint of extremely great rigidity and alignment of parts after their application may be readily adjusted. In such case, if desired, the skeleton may remain on the jig until after the braces 17 are applied.

Figure 14:
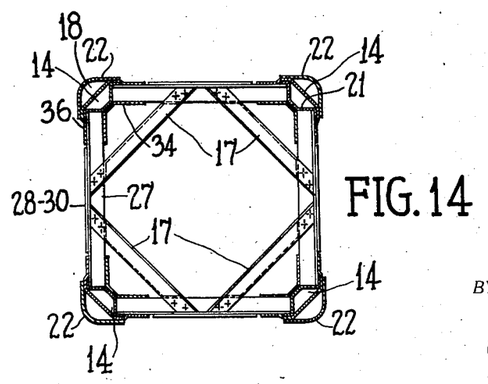
Figure 15:
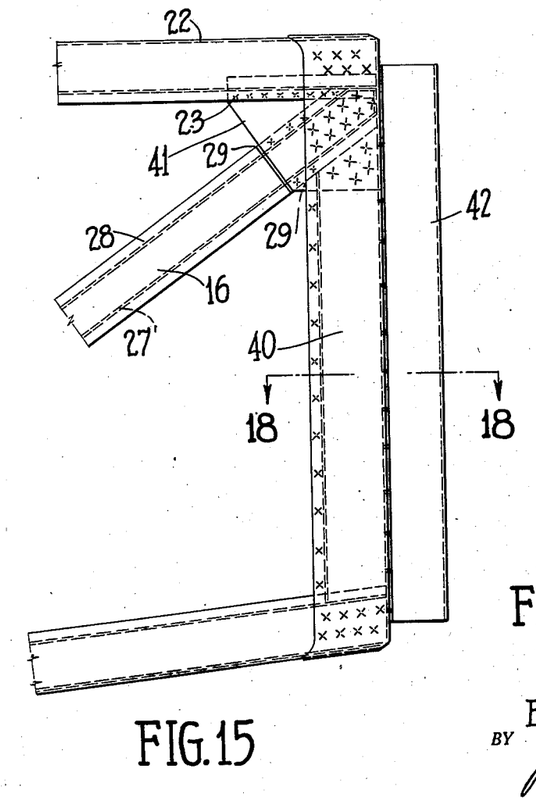
Figure 16:
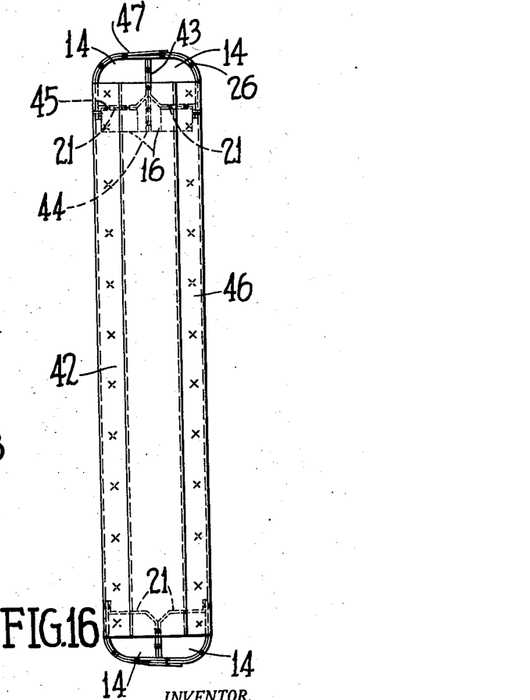
Figure 17:
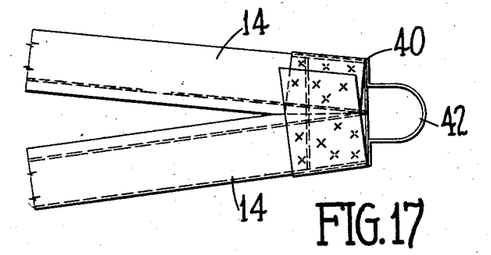
Figure 18:
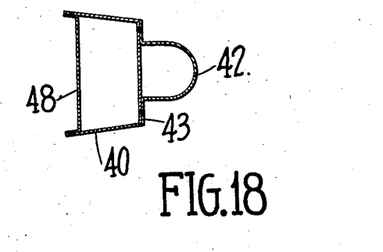
Fig. 18 is a transverse cross section on line 18—18.

Finally, (except insofar as the joints associated with the support of motor beds 13 and the tail 12 may modify the procedure), all parts which need be joined interiorly of the section having been assembled together, and need for interior access to the sections having ceased, the open outwardly presenting sections of the parts 21 and 27 of the chords and struts respectively are closed, as indicated in the final stages of construction illustrated in Fig. 4. The longitudinally extending complemental inwardly presenting parts 22 and 28 of the chords 14 and the struts 15 and 16 are applied to the heretofore open cross sections 21 and 27 of those parts. In the case of the struts extended edges 30 are applied to outturned flanges 29 and spot welded thereto. In the case of the chord members 14 the extended edges 24 are applied to the outturned flanges 23 and spot welded thereto, and at the joints 18 the edges 24 are spot welded likewise to portions at least of the joint gussets 36. The results are completed joints such as are shown fully in Fig. 2 and a completed body such as shown fully in transverse cross section in Fig. 14. It is relatively immaterial whether the struts 15—16 are completed first or whether the chords 14 are completed first, but I prefer, in order to keep the interior of the joints 18 open until the last minute on account of some possible need, to complete the chord members 14 last. When they are completed, the body, in the event that the nose and tail joints have been completed, is ready for the fabric or other cover.

Obviously, the construction and method are applicable to the body at large and are applicable also to the joints of the truss structure which supports the motor beds 13, albeit these joints are of rather irregular form. These joints are similarly constructed differing essentially only in the number of members which are joined together and the angles at which they have been joined. Of course, the joints 18, while having a general similarity, differ from each other markedly in the angles and in some cases curvature of the members which are joined together as well as in the number of those members, depending upon the station at which the joint is located.

The construction of the tail 12 is shown in Figs. 15 to 18. The endmost transverse strut 40 is like the intermediate such struts 15 of channel cross section as appears in Figs. 17 and 18. But it presents inwardly of the body and not outwardly. The width of the channel is sufficient to accommodate the pairs of contiguous ends of the diagonal struts 16 and of the upper between lower pairs of chords 14 and the vertically extending walls of those struts whereby the channel cross section constitutes laterally an elongated socket in which these upper and lower pairs of chords 14 are accommodated. (See also Fig. 16.) The endmost diagonal struts 16 likewise have their rear ends converged to contiguity and socketed together between the side walls of strut 40. Gussets 41 reinforce the joints. The side walls of the channel section strut 40 are extended upwardly and downwardly to overlap the outer walls of the members 14 as appears in Fig. 16. A U shaped rudder socket member 42 has its sides provided with outturned flanges 43 for mounting on the rear of the strut 40.

In assembly the ends of the inner outwardly presenting parts 21 of the upper and lower pairs of chord members 14 are brought into contiguity at the proper terminal length and at their extremities spot welded as at 43. The ends of the endmost diagonal struts 16 are similarly treated being spot welded together as at 44. They are also spot welded to the side walls of the parts 21 as at 45. Thereupon gussets 41, of the shape essentially that shown in Fig. 15 and which are joint reinforcing gussets, are spot welded to the flanges 23 and 29 of members 21 and 27. This is all before the outwardly presenting open and freely accessible cross sections of members 21 and 27 have been closed. Now the parts 21 of the chord members 14 are closed by applying the inwardly presenting sections 22.

At this stage channel section strut 40 is applied. The rudder socket 42 is spot welded by its flanges 43 to the bottom of the channel section of the strut before its application to the body. The height of this socket 42 substantially equals the height of the bottom wall 46 of the channel. This bottom wall 46 does not reach at either end to the rounded apex 26 of the chords 14. The side walls, however, are provided with extensions 47 which are wrapped around the tops of the chord members 14 and spot welded to these chord members and to each other from the interior of the members 14 through the access to the interior afforded by the foreshortened bottom wall 46 of the strut 40. Spot welding, as in cases of other joints and to an even greater extent in this case, may be general and generous throughout the overlapped areas. The side walls of member 40 are then spot welded to the gussets 41 by access through the still open section 27 of member 16, welding tools being reached inwardly of the section, rounding the edge of the gusset as in case of the joints 18. Generous welding is applied also through the gusset to the flanges 29 of the part 27 and also directly to the gusset below the member 27 in each case. There is one of these gussets 41 on each side of this joint. Finally, the open mouth of the inwardly presenting channel section member 40, which has afforded access for these direct welds to the gusset, is closed by an edge flanged member 48 of substantially plane form the edge flanges of which are spot welded to the edges of side walls of the member 40 as clearly appears in Figs. 15 and 18. On application of this member and the outer parts 28 of the rearmost diagonal struts 16, the body is complete.

An invention of such adaptability can but be possessed of a great number of modifications and be susceptible of a great number of improvements without departing in any wise from its generic spirit. The annexed claims, therefore, should be interpreted irrespective of the terminology in terms of that spirit.

What I claim is:

1. A sheet metal aircraft truss structure comprising a chord member of closed cross section composed of inner and outer complemental parts of open cross section, the inner part having relatively wide substantially flat faces and transverse members abutting said faces at substantially right angles and secured to the flat faces of said inner parts from the inside of said hollow cross section, the outer faces of said transverse members being in substantially the plane of the adjacent face of the outer chord part.

2. A frame truss for aircraft bodies comprising a chord member of open cross section presenting outwardly of the truss and having relatively wide substantially flat faces, transverse members abutting said faces at substantially right angles and secured to the inside of said faces and to means projected from the outwardly presenting outside edges of said section of the chord, and means closing the open cross section member.

3. A frame truss for aircraft bodies comprising a chord member of open cross section presenting outwardly of the truss and having relatively wide substantially flat faces, transverse members abutting said faces at substantially right angles and secured to the inside of said substantially flat faces and to means projected from the outwardly presenting outside of the section of the chord, and a complemental chord portion also of open cross section presenting inwardly of the truss and joined to said means to form with the first named chord section a chord of closed cross section.

4. An aircraft body truss structure comprising a chord member of angle cross section presenting diagonally outwardly of the body structure and having a flattened apex foreshortening the sides of the structure, strut members secured to the respective foreshortened sides on their inner faces, and a gusset member interconnecting the inner faces of the struts and the flattened apex of the chord.

5. An aircraft body truss structure including a chord member comprised of complemental open sections together producing a chord of closed cross section, and a diagonal reinforcing member intervened between the complemental sections and extended beyond said section to form attaching means for strut members.

6. An aircraft body truss comprising a chord member of open angle cross section presenting outwardly of the truss, struts connected with the inner faces of said open section chord member, and a plane form gusset member closing the mouth of said open section and extended beyond the sections to provide additional attaching means for said struts.

7. An aircraft body truss comprising a chord member of open angle section presenting outwardly of the body structure and providing relatively wide substantially flat faces, struts connected to the inner substantially flat faces of said chord member respectively, and a plane form gusset member closing the mouth of said open section chord at the strut joints and connected with the outer faces of the struts.

8. An aircraft body truss comprising chord members having relatively flat faces together with cross struts of channel section sheet metal abutting said flat faces at substantially right angles and secured to said chord member through their extended side walls.

9. An aircraft body truss comprising chord members of sheet metal providing substantially flat faces, and sheet metal strut members of channel cross section abutting said faces at substantially right angles, and secured thereto through their extended side walls.

10. An aircraft body truss comprising chord members of sheet metal, U clips secured to the chord, transverse struts of channel shaped cross sections secured to the U clips through their side walls, and diagonal channel section strut members secured to the chord and the transverse strut members through their side walls.

11. An aircraft body truss comprising chord members of open section presenting outwardly and having outturned flanges and strut members also presenting outwardly of open section and having outturned flanges secured to the first named flanges, the strut members being additionally secured to the chord members through extensions of their side walls.

12. An aircraft body truss comprising chord members of open section presenting outwardly of the truss and providing substantially flat faces, strut members of open section also presenting outwardly of the truss and abutting said faces at substantially right angles and secured thereto through extensions of their side walls, together with plane form external members closing the mouths of the open sections of the members.

13. In an aircraft truss, a chord member comprising an open section angle part presenting outwardly of the body and having a flattened apex which foreshortens the branches of the open section, and an external open section angle part complemental to the first named part presenting inwardly and having a rounded apex.

14. An aircraft body truss comprising a chord member of an open sectioned outwardly flanged part presenting diagonally outwardly, open section struts having their side walls flanged and also presenting outwardly, spot welds securing the struts to the chord through their side walls, interior gussets spot welded commonly to the bottom walls of the struts and exterior gussets spot welded commonly to the flanges of the side walls of the struts.

15. An aircraft body truss comprising a chord member of an open section outwardly flanged part presenting diagonally outwardly, open section struts having their side walls flanged and also presenting outwardly, spot welds securing the struts to the chord through their side walls, interior gussets spot welded to the bottom walls of the struts, exterior gussets spot welded commonly to the flanges of the side walls of the struts, which exterior gusset diagonally closes the mouth of the open section chord member at the joint, and an open section complemental chord member having its branches spot welded to the flanges of the first named chord member to constitute it a closed cross section and also spot welded to the exterior gusset.

16. An aircraft body rear strut of inwardly facing channel section, and a rudder socket secured to the bottom wall of said strut.

17. An aircraft body tail construction comprising a vertical strut of inwardly presenting channel form to form a socket for receiving the longitudinal chords, and having its side walls extended and turned in over an additional face of the chords.

18. A truss structure of sheet metal comprising a chord member of angle cross section presenting outwardly of the truss, the branches of the angle providing relatively wide substantially flat seats, transverse members extending at substantially right angles to said flat seats and abutting and overlapping the same and secured thereto in said overlapping relation, and means closing the angle section of said outwardly presenting angle cross section member.

19. An aircraft body truss structure comprising a chord member of angle cross section presenting diagonally outwardly of the body, the arms of said angle forming relatively wide flat faces and having edge flanges, and inter-chord struts abutting the faces at substantially right angles and secured to the respective inner substantially flat faces of the chord and to said edge flanges.

In testimony whereof he hereunto affixes his signature.

EARL J. W. RAGSDALE.